March 27, 1928.                        1,664,126
E. E. MEISEKOTHEN
DRY BATTERY CONSTRUCTION
Filed Aug. 28, 1925         2 Sheets-Sheet 1

March 27, 1928.
E. E. MEISEKOTHEN
1,664,126
DRY BATTERY CONSTRUCTION
Filed Aug. 28, 1925     2 Sheets-Sheet 2
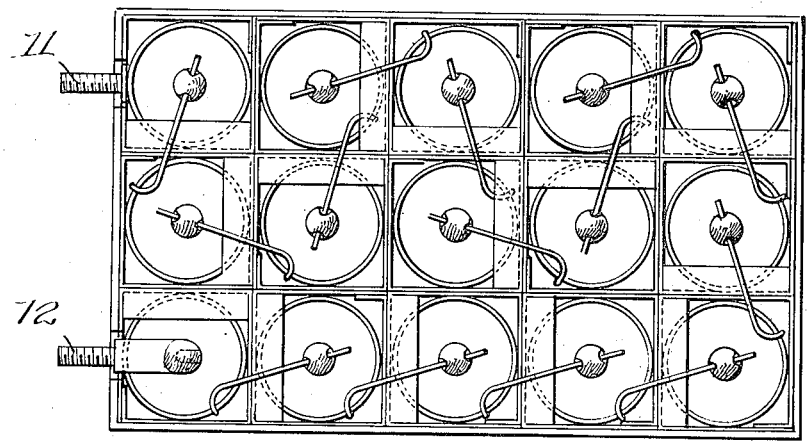
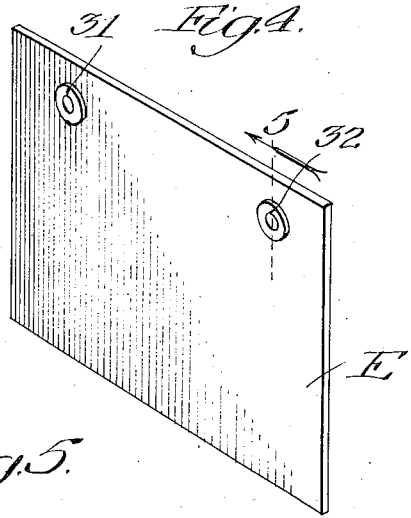
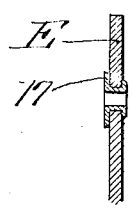
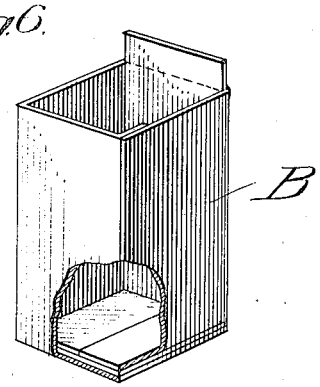
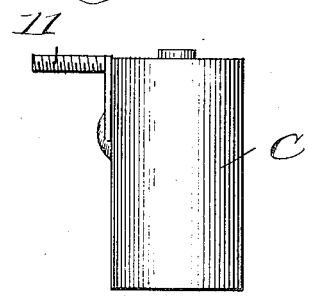
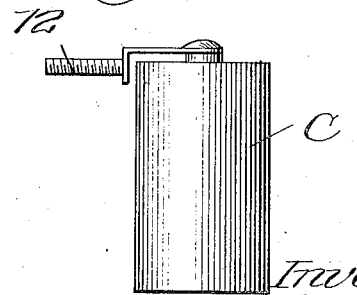
Inventor,
Edwin E. Meiskothen,
By Dyrenforth, Lee, Crittus & Wiles
Attys.

Patented Mar. 27, 1928.

1,664,126

UNITED STATES PATENT OFFICE.

EDWIN E. MEISEKOTHEN, OF MADISON, WISCONSIN, ASSIGNOR TO FRENCH BATTERY COMPANY, OF MADISON, WISCONSIN, A CORPORATION OF WISCONSIN.

DRY-BATTERY CONSTRUCTION.

Application filed August 28, 1925. Serial No. 53,070.

This invention relates to improvements in dry batteries and more especially to the construction of a dry battery having a relatively large number of cells, such as, for example, is used for a "B" battery in radio work.

In the making of such batteries, numerous problems and difficulties are encountered in properly assembling, arranging and connecting the individual cells, and holding them neatly and securely in place in a completed battery.

By the use of my invention, such a battery may be cheaply and easily made and will be neat in appearance, strong and durable.

Other features and advantages of my invention will appear more fully as I proceed with my specification.

In that form of device embodying the features of my invention, shown in the accompanying drawings, Figure 1 is a view in perspective of the battery showing the same before completion; Fig. 2 is a similar view of the completed battery showing portions broken away to disclose the construction; Fig. 3 is a top plan view of the battery before completion; Fig. 4 is a view of the end piece forming a part of the completed battery; Fig. 5 is a view taken as indicated by the line 5 of Fig. 4; Fig. 6 is a view in perspective of one of the individual cell cartons; Fig. 7 is a view in side elevation of one of the individual cells showing the terminal connection to the zinc shell, and Fig. 8 is a similar view showing the terminal connection to the carbon element of a cell.

As shown in the drawings, B indicates one of the individual cell cartons which may be made of any suitable material such as, for example, cardboard or stiff paper in any desired manner. The particular form and construction of the individual cell cartons forms no part of the present invention, and consequently will not be explained in detail herein. Such cartons, if desired, may be made out of a suitable blank of cardboard or stiff paper cut in any suitable shape so that it may be folded into a rectangular-shaped box similar to the one shown. If desired, the individual cell carton may be made in accordance with the disclosure in Figs. 6 to 8, inclusive, in Patent No. 1,636,478, granted July 19, 1927.

A plurality of cell cartons B, here shown as fifteen in number, are assembled or nested in the box A which is just large enough to contain the number of such cartons which it is desired to compose the completed battery. The sides of the box A are slightly higher than the cartons B. The cartons are preferably held in place in the box A in any suitable manner, such as, for example, by glue 10 on their bottoms and around the lower margins of the outer sides.

After the cartons B are in place, the individual cells C are placed in the same and suitably connected by the wires 14. 11 and 12 indicate the terminal binding posts, one being connected to the zinc shell of an end cell and the other to the carbon element of an end cell in the usual manner. The box A is provided at one end with the notches 11' and 12' to accommodate the terminal binding posts 11 and 12.

After the cells are in place, a rectangular sheet of filler material such as corrugated pasteboard D is then placed over the cell cartons, and over this is placed another sheet of similar material D'. The filler sheets D and D' serve to fill the box A above the cell cartons; the upper surface of sheet D' lying substantially flush with the upper edges of the sides of the box A. After the sheets D and D' are in place, the gummed strips of paper 19 and 20 are applied as shown in order to hold the parts together. The battery in this stage of construction is shown in Fig. 1.

The whole is then slipped into an outer box F which has its end as indicated by 21 projecting slightly beyond the end of the box A. The box A is held in place in the outer box F in any suitable manner, such as, for example, by the margin of glue 18 around the outer end. The end piece E is then put in place. This end piece E is provided with two holes 31 and 32 adapted to accommodate the terminal posts 11 and 12 and is just small enough so that it will lie within the margin 21 of the box F. The piece E is held in place by the nuts 15 on the binding posts 11 and 12. Each of the holes 31 and 32 in the piece E is provided with a rivet or eyelet 17 (see Fig. 5) to prevent the nut 15 from pulling through the paper or cardboard of which the member E is made.

The boxes A and F may be made of any suitable material such as, for example, cardboard.

The nuts 15 on the terminals 11 and 12 serve to attach the battery to the wires of an external circuit. Any suitable means, such as the commonly employed clips, may be used in lieu of nuts.

The foregoing detailed description has been given for clearness of understanding only, and no unnecessary limitations should be understood therefrom, but the appended claims should be construed as broadly as permissible in view of the prior art.

What I claim as new, and desire to secure by Letters Patent, is:

1. A battery comprising: an outer box open at one end; an inner box therein insertable through the open end of the outer box and having an open side; a plurality of individual rectangular cell-cartons nested in said inner box having open ends presented to the open side of the inner box; electrical connections between said cells; terminal binding posts attached to some of said cells and projecting through an end wall of said inner box and out of the open end of said outer box; an end piece acting as a closure for said outer box and provided with holes through which said binding posts project; and wire-attaching means on said binding posts outside said end piece.

2. A battery comprising: an outer box open at one end; an inner box therein insertable through the open end of the outer box and having an open side; a plurality of individual rectangular cell-cartons nested in said inner box having open ends presented to the open side of the inner box; electrical connections between said cells; sheet filler material filling the space in said inner box above the cells and cell-cartons; terminal binding posts attached to some of said cells and projecting through an end wall of said inner box and out of the open end of said outer box; an end piece acting as a closure for said outer box and provided with holes through which said binding posts project; and nuts on said binding posts securing said end piece in position.

3. A battery comprising: an outer box open at one end; an inner box therein insertable through the open end of the outer box and having an open side; a plurality of individual rectangular cell-cartons nested in said inner box having open ends presented to the open side of the inner box; electrical connections between said cells; sheet filler material filling the space in said inner box above the cells and cell-cartons; adhesive tape extending about said inner box and securing the filler material in position; terminal binding posts attached to some of said cells and projecting through an end wall of said inner box and out of the open end of said outer box; an end piece acting as a closure for said outer box and provided with holes through which said binding posts project; and nuts on said binding posts securing said end piece in position.

In testimony whereof, I have hereunto set my hand this 20th day of August, 1925.

EDWIN E. MEISEKOTHEN.